(12) United States Patent
Tian et al.

(10) Patent No.: US 11,692,832 B2
(45) Date of Patent: Jul. 4, 2023

(54) SYSTEMS, METHODS, AND COMPUTER PROGRAMS FOR EFFICIENTLY DETERMINING AN ORDER OF DRIVING DESTINATIONS AND FOR TRAINING A MACHINE-LEARNING MODEL USING DISTANCE-BASED INPUT DATA

(71) Applicant: Bayerische Motoren Werke Aktiengesellschaft, Munich (DE)

(72) Inventors: Jilei Tian, Chicago, IL (US); Yang Cao, Chicago, IL (US); Sascha Hamzehi, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 241 days.

(21) Appl. No.: 16/947,233

(22) Filed: Jul. 24, 2020

(65) Prior Publication Data
US 2022/0026221 A1   Jan. 27, 2022

(51) Int. Cl.
*G01C 21/34* (2006.01)
*G06N 20/00* (2019.01)
*G06F 18/21* (2023.01)

(52) U.S. Cl.
CPC ....... *G01C 21/343* (2013.01); *G01C 21/3446* (2013.01); *G06F 18/217* (2023.01); *G06N 20/00* (2019.01)

(58) Field of Classification Search
CPC .. G01C 21/343; G01C 21/3446; G06N 20/00; G06K 9/6262
See application file for complete search history.

(56) References Cited

U.S. PATENT DOCUMENTS 11,157,866 B2 * 10/2021 Bostick ............ G06Q 10/08355
2020/0124429 A1   4/2020 Zhang et al.
(Continued)

OTHER PUBLICATIONS

Irwan Bello et al.: Neural Combinatorial Optimization with Reinforcement Learning; under review as a conference paper at ICLR 2017; arXiv:1611.09940v3 [cs.AI] Jan. 12, 2017.
(Continued)

*Primary Examiner* — Peter D Nolan
*Assistant Examiner* — Mikko Okechukwu Obioha
(74) *Attorney, Agent, or Firm* — 2SPL Patent Attorneys PartG mbB; Kieran O'Leary

(57) ABSTRACT

Examples relate to systems, method and systems, methods and computer programs for efficiently determining an order of driving destinations and for training a machine-learning model using distance-based input data. A system for determining an order of a plurality of driving destinations is configured to obtain information on a distance between the plurality of driving destinations, the distance being defined for a plurality of routes between the plurality of driving destinations, with the routes being defined separately in both directions between each combination of driving destinations of the plurality of driving destinations within the information on the distance. The system is configured to provide the information on the distance between the plurality of driving destinations as input to a machine-learning model, the machine-learning model being trained to output information on an order of the plurality of routes based on the information on the distance provided at the input of the machine-learning model. The system is configured to determine the information on the order of the plurality of driving destinations based on the information on the order of the plurality of routes.

15 Claims, 4 Drawing Sheets

```
┌─────────────────────────────────────────────┐
│  OBTAINING INFORMATION ON A DISTANCE        │
│     BETWEEN DRIVING DESTINATIONS            │
└─────────────────────────────────────────────┘
                     │                          ╲110
┌─────────────────────────────────────────────┐
│   PROVIDING THE INFORMTION ON THE           │
│       DISTANCE AS INPUT TO A                │
│      MACHINE-LEARNING MODEL                 │
└─────────────────────────────────────────────┘
                     │                          ╲120
┌─────────────────────────────────────────────┐
│  DETERMINING INFORATION ON AN ORDER         │
│      OF THE DRIVING DESTINATIONS            │
└─────────────────────────────────────────────┘
                                                ╲130
```

(56) References Cited

U.S. PATENT DOCUMENTS

| | | | | |
|---|---|---|---|---|
| 2021/0318685 | A1* | 10/2021 | Jenkins | B60L 53/665 |
| 2021/0325195 | A1* | 10/2021 | Haghani | B60W 60/001 |
| 2021/0374669 | A1* | 12/2021 | Neumann | G06Q 10/08355 |
| 2021/0398159 | A1* | 12/2021 | Nagasaka | G05B 13/0265 |
| 2022/0187089 | A1* | 6/2022 | Leung | B60W 50/14 |
| 2022/0215471 | A1* | 7/2022 | Simpson | G06Q 30/0641 |

OTHER PUBLICATIONS

Mohammareza Nazari et al.: Reinforcement Learing for Solving the Vehicle Routing Problem; Department of Industrial and Systems Engineering Lehigh University, Bethlehem, PA 18015.

W. Kool et al.: Attention, learn to solve routing problems!; In ICLR 2019: International Conference on Learing Representations: New Orleans, Louisiana, United States, May 6-May 9, 2019 Open Review.

Gambardella Luca M. et al: "Ant-Q: A Reinforcement Learning approach to the traveling salesman problem", Machine Learning Proceedings 1995, Proceedings of the Twelfth International Conference on Machine Learning, Tahoe City, California, Jul. 9-12, 1995, Jul. 9, 1995 (Jul. 9, 1995), pp. 252-260, https://web.archive.org/web/20060925072934id_/http://www.cs.ualberta.ca/~bulitko/F05/CMPUT651/papers/ant.pdf.

Quinlan Sykora et al: "Multi-Agent Routing Value Iteration Network", arxiv.org, Cornell University Library, 201 Olin Library Cornell University Ithaca, NY 14853, Jul. 10, 2020 (Jul. 10, 2020).

Lei Gao et al: "Learn to Design the Heuristics for vehicle Routing Problem", arxiv . org, Cornell University Library, 201 Olin Library Cornell University Ithaca, NY 14853, Feb. 20, 2020 (Feb. 20, 2020).

Zhang Cong et al: "Effective Charging Planning Based on Deep Reinforcement Learning for Electric vehicles", IEEE Transactions on Intelligent Transportation Systems, IEEE, Piscataway, NJ, USA vol. 22, No. 1, Jun. 24, 2020 (Jun. 24, 2020), pp. 542-554.

Diganta Misra: "Mish: A Self Regularized Non-Monotonic Neural Activation Function", arxiv.org, Cornell University Library, 201 Olin Library Cornell University Ithaca, NY 14853, Aug. 23, 2019 (Aug. 23, 2019).

Kool W et al: "Attention, learn to solve routing problems", Feb. 7, 2019 (Feb. 7, 2019), Retrieved from the Internet: https://arxiv.org/pdf/1803.08475.pdf [retrieved on Feb. 17, 2022].

Bello Irwan et al: "Neural Combinatorial Optimization with Reinforcement Learning", Jan. 12, 2017 (Jan. 12, 2017), Retrieved from the Internet: https://arxiv.org/pdf/1611.09940.pdf [retrieved on Feb. 17, 2022].

* cited by examiner

SYSTEMS, METHODS, AND COMPUTER PROGRAMS FOR EFFICIENTLY DETERMINING AN ORDER OF DRIVING DESTINATIONS AND FOR TRAINING A MACHINE-LEARNING MODEL USING DISTANCE-BASED INPUT DATA

FIELD

Examples relate to systems, method and systems, methods and computer programs for efficiently determining an order of driving destinations and for training a machine-learning model using distance-based input data.

BACKGROUND

In theory, given a list of cities and the distances between each pair of cities, the question of what is the shortest possible route that visits each city and returns to the origin city is called the traveling salesman (TSP) problem, which is an NP-hard problem that has no fast or scalable optimal solution. In previous approaches, deep and/or reinforcement learning has been applied in TSP or alike, with the potential of providing a fast but sub-optimal solution. Those algorithms have, however, all applied the nodes given by coordinates, rather than distance, which results in a gap for driving trip planning relative to the real routing distance on the road network. In addition, the routing distance between two destinations may not always be the symmetric due to one-way routes. For example, "Neural Combinatorial Optimization with Reinforcement Learning", published by Google in ICLR (2017) uses pointer networks to address the TSP problem. It takes coordinates as input to train the model. "Reinforcement leaning for solving the vehicle routing problem", published by Lehigh University in NIPS (2018) improves the presented pointer networks, is, however, also based on using coordinates as input. "Attention, learn to solve routing problems!", published by University of Amsterdam in ICLR (2019) leverages a transformer provided by Google to build an algorithm. This approach also uses coordinates as input to train the model.

SUMMARY

Various examples of the present disclosure are based on the finding, that the actual routes being traveled by the vehicles provide an improved proxy for the favorability of routes within a traveling salesman-scenario. In various examples of the present disclosure, a machine-learning model is used to efficiently determine an order of driving destinations for a vehicle. One of the benefit using a machine-learning model for this task is the speed. The modeling approach can run much faster with a deterministic runtime, whereas the mixed integer programming runs slow, and runtime can vary, depending on the case, particularly in dealing with more constraints. The machine-learning model is provided with the distances between the driving destinations (which may be asymmetric), and uses the distances to output a proposed order, in which the routes are to be travelled. In various examples, the machine-learning model can be designed as self-learnt using the reinforcement learning paradigm. It may improve or optimize the route sequence or node permutation that meets the criteria, e.g. shortest overall distance or time, etc. The training of the machine-learning model may be guided by a properly defined reward function, thus save the big effort for data annotation.

Various examples of the present disclosure provide a system for determining an order of a plurality of driving destinations. The system comprises one or more processors and one or more storage devices. The system is configured to obtain information on a distance between the plurality of driving destinations. The distance is defined for a plurality of routes between the plurality of driving destinations, with the routes being defined separately in both directions between each combination of driving destinations of the plurality of driving destinations within the information on the distance. The system is configured to provide the information on the distance between the plurality of driving destinations as input to a machine-learning model. The machine-learning model is trained to output information on an order of the plurality of routes based on the information on the distance provided at the input of the machine-learning model. The system is configured to determine the information on the order of the plurality of driving destinations based on the information on the order of the plurality of routes. By using a machine-learning model to determine the order of the driving destinations, an effort required for computing the order may be reduced. By using distances between the driving destinations, instead of the coordinates of the driving destinations, the real-life implications of the road network and/or of traffic may be considered when determining the order of driving destinations, which may improve the quality of the ordering for real life trip planning scenario.

In various examples, the machine-learning model is trained to output information on a favorability of the plurality of routes based on the information on the distance provided at the input of the machine-learning model. For example, the routes may be picked according to their favorability, e.g. until all of (or a major subset of) the plurality of driving destinations are accounted for.

In various examples, the machine-learning model is trained using reinforcement learning. A reward function of the training may be based on the distance between the plurality of driving destinations (e.g. toward the optimal route sequence). Reinforcement learning may be used without requiring a ground truth, facilitating the training process. Additionally, the distance, e.g. the overall distance to be travelled by the vehicle while covering all of (or a major subset of) the driving destinations may provide a suitable optimization criterion. For example, the distance may be a distance on the road (e.g. in meters) or a time distance (i.e. duration) In various examples, the machine-learning model comprises one or more embedding layers.

The one or more embedding layers may be based on a non-linear activation function. For example, the one or more embedding layers may be based on a Mish activation function (or alternatives that can perform the better performance). For example, non-linear transfer functions may provide a smooth transition, yielding a smoother loss function, which are easier to optimize.

The machine-learning model may comprise a pre-defined number of inputs for a pre-defined number of driving destinations. For example, if the plurality of driving destinations comprises fewer than the pre-defined number of driving destinations, the information on the distance may comprise one or more (padded) entries having a distance being lower than a threshold to at least one of the plurality of driving destinations. Accordingly, a single machine-learning model may be applied to queries with different numbers of driving destinations.

In various examples, the distance of the routes may be defined along one or more roads. This may model the real-life implications of the road network being used by the vehicle.

Accordingly, the system may be configured to obtain the information on the distance by determining the routes via one or more roads between the plurality of driving destinations based on a plurality of locations corresponding to the plurality of driving destinations. In other words, the system may employ a routing service to determine the distances of the routes between the coordinates of the driving destinations.

In various examples, the plurality of driving destinations comprise one or more stops of a ride-hailing service, a ride-sharing service or a delivery service, e.g. one or more stops of a multi-destination travel, e.g. for several appointments and tasks, charging or refueling. The plurality of driving destinations may comprise one or more charging stations (and the user may select one of them). For example, the presented approach may be applied to a multitude of different use-cases.

Various examples of the present disclosure further provide a system for training a machine-learning model. The system comprises one or more processors and one or more storage devices. The system is configured to obtain training input data for training the machine-learning model. The training input data comprises training information on a distance between a plurality of driving destinations. The distance is defined for a plurality of routes between the plurality of driving destinations, with the routes being defined separately in both directions between each combination of driving destinations of the plurality of driving destinations within the information on the distance. The system is configured to train the machine-learning model using a reinforcement learning algorithm and a reward function (e.g. for efficient self-learning, rather than supervised training on annotation data). The machine-learning model is trained to output information on an order of the plurality of routes based on the training information on the distance provided at the input of the machine-learning model. The reward function is based on the distance between the plurality of driving destinations (e.g. toward the optimal route sequence). The system is configured to provide the machine-learning model. For example, the trained machine-learning model may be used by the system introduced afore.

In various examples, the machine-learning model is trained to output information on a favorability of the plurality of routes based on the information on the distance provided at the input of the machine-learning model. The favorability of the routes may be used to pick the individual routes connected the plurality of driving destinations.

For example, the machine-learning model may comprise one or more embedding layers. The one or more embedding layers may be based on a non-linear activation function. For example, the one or more embedding layers may be based on a Mish activation function (or alternatives that can perform the better performance). For example, non-linear transfer functions may provide a smooth transition, yielding a smoother loss function, which are easier to optimize.

In various examples, the machine-learning model comprises an attention layer. The attention layer may be used to "focus" the attention of the machine-learning model on specific inputs.

For example, the distance of the routes may be defined along one or more roads. This may model the real-life implications of the road network being used by the vehicle.

Various examples of the present disclosure provide a method for determining an order of a plurality of driving destinations. The method comprises obtaining information on a distance between the plurality of driving destinations. The distance is defined for a plurality of routes between the plurality of driving destinations, with the routes being defined separately in both directions between each combination of driving destinations of the plurality of driving destinations within the information on the distance. The method comprises providing the information on the distance between the plurality of driving destinations as input to a machine-learning model. The machine-learning model is trained to output information on an order of the plurality of routes based on the information on the distance provided at the input of the machine-learning model. The method comprises determining the information on the order of the plurality of driving destinations based on the information on the order of the plurality of routes.

Various examples of the present disclosure provide a method for training a machine-learning model. The method comprises obtaining training input data for training the machine-learning model. The training input data comprises training information on a distance between a plurality of driving destinations. The distance is defined for a plurality of routes between the plurality of driving destinations, with the routes being defined separately in both directions between each combination of driving destinations of the plurality of driving destinations within the information on the distance. The method comprises training the machine-learning model using a reinforcement learning algorithm and a reward function. The machine-learning model is trained to output information on an order of the plurality of routes based on the training information on the distance provided at the input of the machine-learning model. The reward function is based on the distance between the plurality of driving destinations. The method comprises providing the machine-learning model.

Various examples of the present disclosure provide a machine-readable storage medium including program code, when executed, to cause a machine to perform one of the above methods, and a computer program comprising instructions, when executed, to cause a machine to perform one of the above methods.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
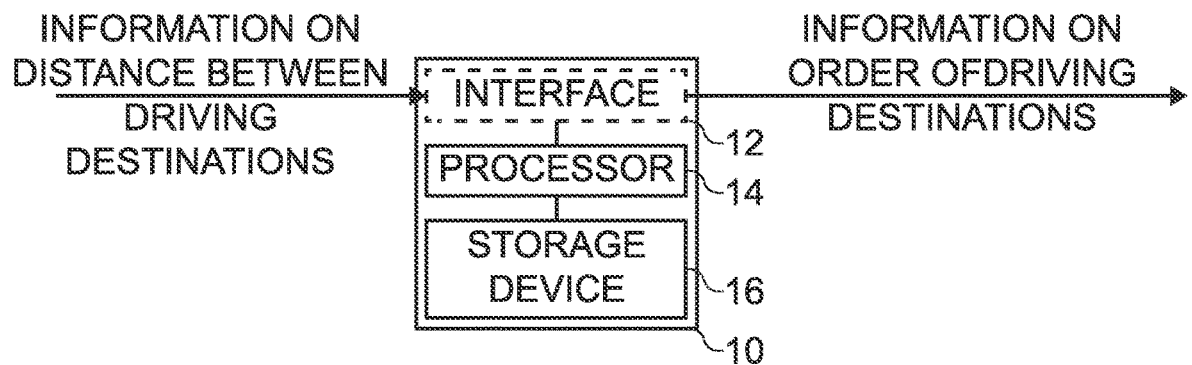
FIG. 1a shows a block diagram of an example of a system for determining an order of a plurality of driving destinations.

Some examples are now described in more detail with reference to the enclosed figures. However, other possible examples are not limited to the features of these examples described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1a shows a block diagram of an example of a system 10 for determining an order of a plurality of driving destinations. The system comprises one or more processors 14 and one or more storage devices 16. Optionally, the system comprises an interface 12 for exchanging information. The one or more processors 14 may be coupled with the one or more storage devices 16 and with the optional interface 12. For example, the one or more processors may be configured to provide the functionality of the system, e.g. in conjunction with the one or more storage devices (for storing information) and/or the interface (for exchanging information).

The system is configured to obtain information on a distance between the plurality of driving destinations. The distance is defined for a plurality of routes between the plurality of driving destinations. The routes are defined separately in both directions between each combination of driving destinations of the plurality of driving destinations within the information on the distance. The system is configured to provide the information on the distance between the plurality of driving destinations as input to a machine-learning model. The machine-learning model is trained to output information on an order of the plurality of routes based on the information on the distance provided at the input of the machine-learning model. The system is configured to determine the information on the order of the plurality of driving destinations based on the information on the order of the plurality of routes.

Figure 1B:
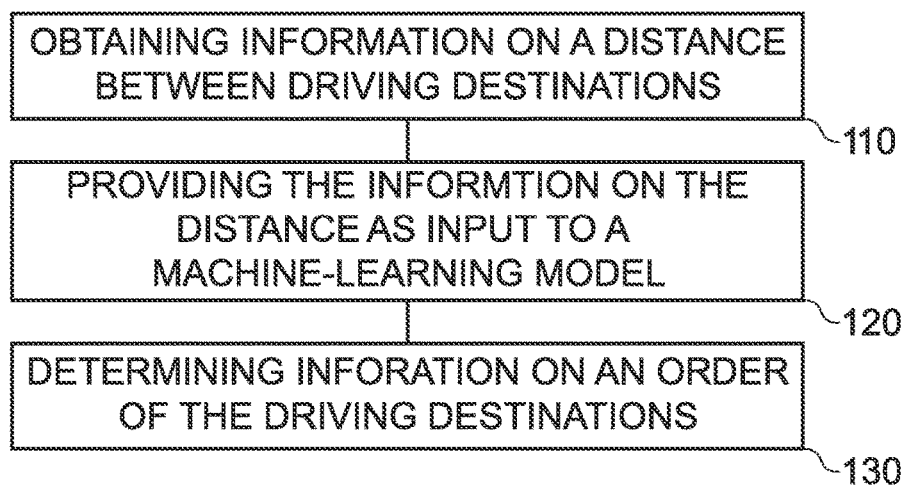
FIG. 1b shows a flow chart of an example of a method for determining an order of a plurality of driving destinations.

FIG. 1b shows a flow chart of an example of a corresponding method for determining an order of a plurality of driving destinations. The method comprises obtaining 110 the information on the distance between the plurality of driving destinations. The method comprises providing 120 the information on the distance between the plurality of driving destinations as input to a machine-learning model. The method comprises determining 130 the information on the order of the plurality of driving destinations based on the information on the order of the plurality of routes.

The following description relates to both the system and to the corresponding method (and computer program).

Various examples of the present disclosure relate to a system, method and computer program for determining an order of a plurality of driving destinations. In general, the determination of the order of the plurality of driving destinations may be likened to the travelling salesman problem, with each of the driving destinations being one of the stops of the travelling salesman problem. Various examples of the present disclosure attempt to address the travelling salesman problem by employing a machine-learning model to determine an approximate (albeit possibly imperfect) order of the driving destinations in a short time, enabling the use of the technology in real-time applications, such as ride-hailing services.

The system uses the information on the distance between the driving destinations to determine the order of the driving destinations. In various examples, the distance between two driving destinations may depend on the roads that are available between the two driving destinations. In other words, the distance of the routes may be defined along one or more roads (or a road network). For example, the distance may be a (geometrical) distance via the one or more roads, or an estimated time distance (i.e. duration) required for traveling between the driving destinations along the one or more roads. As the distance is defined via the roads, also a route from a first driving destination and to a second driving destination may be (subtly) different from a route from the second driving destination to the first driving destination. Accordingly, the information on the distance may be defined for routes from each driving destination to each other driving destination. For example, due to one-way streets, the routes may markedly differ, i.e. be asymmetric. Therefore, the routes are defined separately in both directions between each combination of driving destinations of the plurality of driving destinations within the information on the distance. There may be different types of driving destinations, such as one or more stops of a ride-hailing service, a ride-sharing service or a delivery service, or one or more charging stations. An ordering between the driving destinations may be provided by the presented approach.

The system is configured to obtain the information on the distance between the plurality of driving destinations. For example, the system may be configured to obtain the information on the distance from one of the storage devices or from another system. Alternatively, the system may be configured to determine the information on the distance, e.g. from coordinates of the driving destinations, e.g. using an internal or external routing service. In other words, the system may be configured to obtain the information on the distance by determining the routes via one or more roads between the plurality of driving destinations based on a plurality of locations corresponding to the plurality of driving destinations. For example, the information on the distance may be provided as a matrix, or as vectors that relate to the distances from a given driving destination to the other driving destinations The system is configured to provide the information on the distance between the plurality of driving destinations as input to the machine-learning model. Machine learning refers to algorithms and statistical models that computer systems may use to perform a specific task without using explicit instructions, instead relying on models and inference. For example, in machine-learning, instead of a rulebased transformation of data, a transformation of data may be used, that is inferred from an analysis of historical and/or training data.

Machine-learning models are trained using training input data. Many different approaches may be used to train a machine-learning model. For example, supervised learning, semi-supervised learning or unsupervised learning may be used. In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g. a classification algorithm, a regression algorithm or a similarity learning algorithm. In unsupervised learning, (only) input data might be supplied, and an unsupervised learning algorithm may be used to find structure in the input data, e.g. by grouping or clustering the input data, finding commonalities in the data.

In at least some examples, reinforcement learning (or a derived concept) is used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards). This may be the case in various examples of the present disclosure—the machine-learning model may be trained to provide the order of the routes between the driving destinations. In other words, the machine-learning model is trained to output the information on the order of the plurality of routes based on the information on the distance provided at the input of the machine-learning model. For example, the machine-learning model may be trained to output information on a favorability (i.e. how beneficial the inclusion of a specific route would be for order of the driving destinations) of the plurality of routes based on the information on the distance provided at the input of the machine-learning model.

The machine-learning model may be trained using reinforcement learning. During the training, various approaches may be tried and evaluated based on a reward function that is denoted the reward function. The reward function is used to calculate the cumulative reward. Based on the calculated reward, the machine-learning model may be altered to perform the actions that have led to a higher cumulative reward, leading to a machine-learning model that becomes iteratively better at determining the order of the routes. For example, the reward function of the training may be based on the distance between the plurality of driving destinations. The training of such a machine-learning model is discussed in mode details in relation with FIGS. 2a to 2b.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input. In at least some examples, the machine-learning model may be deep neural network, e.g. a neural network comprising one or more layers of hidden nodes (i.e. hidden layers), preferably a plurality of layers of hidden nodes. In some examples, the machine-learning model may be a pointer network.

Machine-learning models are usually used by applying input data to an input of the machine-learning model, and by using the output data that is provided at an output of the machine-learning model. In artificial neural networks, the input data is provided at the input nodes of the ANN, the input data is subsequently transformed based on the weights of the edges between the nodes of the artificial neural network, and finally output by the output nodes of the ANN. In this case, the previously obtained information is provided as input to the machine-learning model. For example, the ANN may comprise one or more of an embedding layer, a (masked) attention layer, a pointer network layer, and a decoding layer, to transform the data between input layer and output layer. In other words, the machine-learning model may comprise one or more embedding layers (e.g. one or more neural network layers). For example, the one or more embedding layers may be based on a non-linear activation function, such as the Mish activation function or based on parametric rectified linear units (PReLU). The system is configured to provide the information on the distance between the plurality of driving destinations as input to the machine-learning model. For example, the system may be configured to use/execute the machine-learning model to affect the transformation between the input and output of the machine-learning model.

The training of machine-learning models requires significant effort, so being able to re-use a machine-learning model for different problem sizes may reduce the overall training time. In various examples of the present disclosure, the machine-learning model may be applied to different numbers of the driving destinations. For example, the machine-learning model may comprise a pre-defined number of inputs for a pre-defined number of driving destinations. For example, the machine-learning model may be trained for the pre-defined number of driving destinations, e.g. at least 6, at least 8, at last 10, at least 12. If the plurality of driving destinations comprises fewer driving destinations, the remaining inputs may be fed with dummy data, e.g. with dummy driving destinations that have a very low or zero distance to one of the actual driving destinations. In other words, if the plurality of driving destinations comprises fewer than the pre-defined number of driving destinations, the information on the distance may comprise one or more (padded) entries (i.e. dummy driving destinations) having a distance being lower than a threshold (e.g. being zero) to at least one of the plurality of driving destinations.

The system is configured to determine the information on the order of the plurality of driving destinations based on the information on the order of the plurality of routes. For example, as mentioned above, the information on the order of the plurality of routes may indicate the favorability of the individual routes. Additionally, the plurality of driving destinations may comprise a (fixed) starting destination, and a fixed ending destination. The system may select routes of the plurality of routes based on their respective favorability, and use them to connect driving destinations on a graph without creating a cycle within the graph, with the starting and ending destination being connected only to a single other driving destination (except the respective other). The order of the plurality of driving destinations may start from the starting destination, end at the ending destination, and include the driving destinations on the path between the driving and ending destination in the graph.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information.

In examples the one or more processors 14 may be implemented using one or more processing units, one or more processing devices, any means for processing, such as a processor, a computer or a programmable hardware component being operable with accordingly adapted software. In other words, the described function of the ne or more processing modules 14 may as well be implemented in software, which is then executed on one or more programmable hardware components. Such hardware components may comprise a general-purpose processor, a Digital Signal Processor (DSP), a micro-controller, etc.

In at least some examples, the one or more storage devices 16 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system, method and computer program for determining the order between the plurality of driving destinations are mentioned in connection with the proposed concept or one or more examples described above or below (e.g. FIG. 2a to 5). The system, method and computer program for determining the order between the plurality of driving destinations may comprise one or more additional optional features corresponding to one or more aspects of the proposed concept or one or more examples described above or below.

Figure 2A:
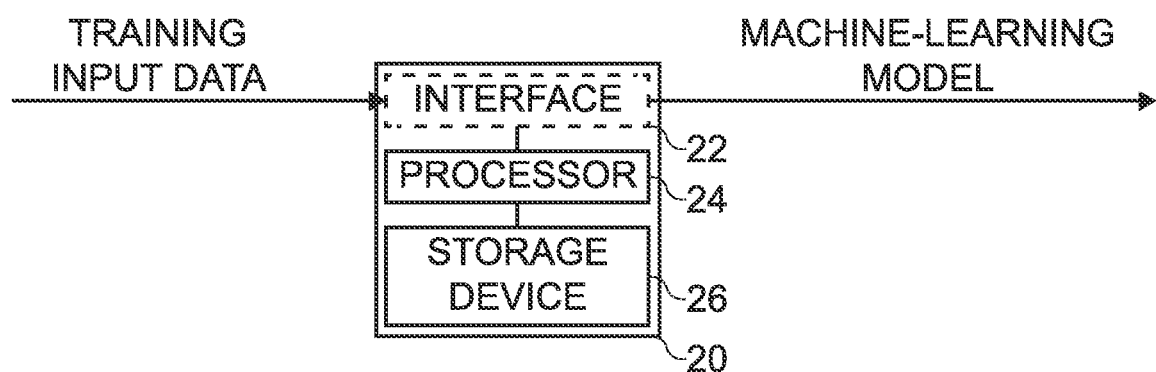
FIG. 2a shows a block diagram of an example of a system for training a machine-learning model.

FIG. 2a shows a block diagram of an example of a system 20 for training a machine-learning model. The system comprises one or more processors 24 and one or more storage devices 26. Optionally, the system comprises an interface 22 for exchanging information. The one or more processors 24 may be coupled with the one or more storage devices 26 and with the optional interface 22. For example, the one or more processors may be configured to provide the functionality of the system, e.g. in conjunction with the one or more storage devices (for storing information) and/or the interface (for exchanging information).

The system is configured to obtain training input data for training the machine-learning model. The training input data comprises training information on a distance between a plurality of driving destinations. The distance is defined for a plurality of routes between the plurality of driving destinations, with the routes being defined separately in both directions between each combination of driving destinations of the plurality of driving destinations within the information on the distance. The system is configured to train the machine-learning model using a reinforcement learning algorithm and a reward function. The machine-learning model is trained to output information on an order of the plurality of routes based on the training information on the distance provided at the input of the machine-learning model. The reward function is based on the distance between the plurality of driving destinations. The system is configured to provide the machine-learning model.

Figure 2B:
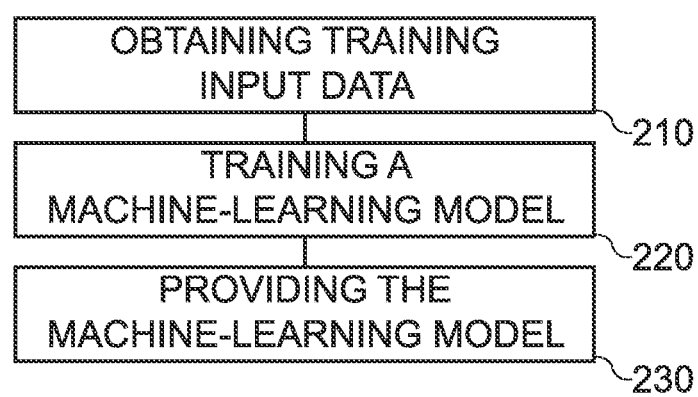
FIG. 2b shows a flow chart of an example of a method for training a machine-learning model.

FIG. 2b shows a flow chart of an example of a corresponding method for training a machine-learning model. The method comprises obtaining 210 the training input data for training the machine-learning model. The method comprises training 220 the machine-learning model using the reinforcement learning algorithm and the reward function. The method comprises providing 230 the machine-learning model.

The following description relates to both the system and to the corresponding method (and computer program).

Some examples of the present disclosure relate to a method, computer program and system for training the machine-learning model. In connection with FIGS. 1a to 1b, an application of a machine-learning model in the determination of an order of driving destinations is shown. The system, method and computer program of FIGS. 2a to 2b may now be used to train such a machine-learning model. This is in no way a mandatory feature—the machine-learning model of FIGS. 1a to 1b may alternatively trained using other approaches, but the system, method and computer program of FIGS. 2a to 2b may provide at least some examples that yield a machine-learning model that is suitable for use with the system, method and computer program and system of FIGS. 1a to 1b.

The method comprises obtaining 210 the training input data for training the machine-learning model. For example, the training input data may be obtained via an interface, e.g. the interface 22 of the system 20. The training input data may be obtained from a database, from a file system, or from a data structure that is stored in a computer memory. The training input data comprises training information on a distance between a plurality of driving destinations. In at least some examples, the training information on the distance between a plurality of driving destinations may be implemented similar to the information on the distance between a plurality of driving destinations introduced in connection with FIGS. 1a to 1b. The term "training information" may merely indicate that the respective data is suitable for, i.e. designed for, training the machine-learning model. For example, the training information may comprise information on the distance between a plurality of driving destinations that is representative of the respective data that is to be processed by the machine-learning model, e.g. in order to obtain a machine-learning model that is suitable for the task at hand, e.g. suitable for evaluating a favorability of a plurality of routes between the plurality of driving destinations.

The method comprises training 220 the machine-learning model to output information on an order of the plurality of routes based on the training information on the distance provided at the input of the machine-learning model. In other words, the machine-learning model may be provided with the training input data, which represents a plurality of scenarios of distances between driving destinations, and with the task of finding ever better ways of determining and order/favorability of routes between the driving destinations.

The machine-learning model may be iteratively tweaked to iteratively improve the order of the plurality of routes. To decide on which routes have merits, the reward function. In general, the reward function may be a function that provides an objective measure of a quality of a route of the plurality of routes. For example, the training may be performed with the aim of improving the result of the reward function.

In general, the reward function may have many components, i.e. factors that determine a quality of a route or of a plurality of routes. For example, the reward function is based on the distance between the plurality of driving destinations, e.g. based on an overall distance of the routes being included according to the order of the routes introduced in connection with FIGS. 1a and/or 1b. For example, the reward function may reward combinations of routes that lead to a shorter overall distance (if a non-cyclic route is constructed from the most favorable routes), and sanction combinations of routes that lead to a longer overall distance. Again, the distance may be defined along one or more roads, and be a geometric distance or a distance in time. In some examples, further properties of the routes may be considered, such as a weather along those routes, and a time window of an availability of driving destinations.

The machine-learning model is trained 220 using reinforcement learning. As mentioned above, in reinforcement learning, one or more software actors (called "software agents") are trained to take actions in an environment. In examples, the environment may be a simulated environment that is based plurality of routes between the driving destinations. The one or more software actors may give favorability ratings to the routes. Based on the taken actions e.g. the favorability ratings, and the resulting order of the routes, a reward is calculated. In other words, the reward function may be used to calculate the reward in the reinforcement learning-based training of the machine-learning model. Reinforcement learning is based on training the one or more software agents to choose the actions such, that the cumulative reward is increased, leading to software agents that become better at the task they are given (as evidenced by increasing rewards). In examples, the determination of the favorability of the routes may be repeatedly performed. Between the repetitions, the machine-learning model may be adjusted based on the ratings that have led to a high (or low, depending on implementation) reward.

For example, the machine-learning model may be trained 220 by repeatedly (e.g. at least two times, at least five times, at least ten times, at least 20 times, at least 50 times, at least 100 times, at least 1000 times) performing a group of training tasks (or method steps). For example, the machine-learning model may be trained 220 by repeatedly inputting the training input data into the machine-learning model, determining an order of the routes based on an output of the machine-learning model, evaluating the order of the routes using the reward function, and adjusting the machine-learning model based on a result of the evaluation.

One repetition of the above tasks may be denoted an "epoch" in reinforcement learning. One Epoch is when the entire set of training input data is passed forward and backward through the machine-learning model once. Within an epoch, a plurality of batches of training input data may be input into the machine-learning model, used to determine the favorability of the routes, and evaluated. For example, to keep the problem size small, the training data may be subdivided (i.e. "batched") into a plurality of batches, which may be separately provided to the machine-learning model. Each batch of the plurality of batches may be input to the machine-learning model separately.

Based on the training input data, the machine-learning model may provide an output. In the reinforcement learning-based training of the machine-learning model, the one or more software actors (which may act based on the machine-learning model) may assign a favorability to routes of the plurality of routes, based on the reward function, in order to increase or maximize the reward. In the present case, the determination of the order of the routes may occur based on the output of the machine-learning model, i.e. not within the machine-learning model. Accordingly, the reward function may be based on the order of the plurality of routes, which is in turn based on the output of the machine-learning model. This assignment of favorability may be evaluated using the reward function. In other words, the software agents may assign a favorability to routes. The order of the routes may, in turn, be based on the assigned favorability of the routes. The reward function, may in turn be used to evaluate the order of the routes, acting as an indirect measure of the quality of the favorability ratings. Based on the result of the evaluation, the machine-learning model may be adjusted, e.g. by incorporating a behavior of software agents that has led to a higher reward.

As has been mentioned in connection with FIGS. 1a and/or 1b, the machine-learning model may comprise one or more embedding layers, which may be based on a non-linear activation function, such as a PReLU or Mish activation function. For example, the one or more embedding layers, which may be neural network layers, may be trained as part of the reinforcement learning training. Similarly, the machine-learning model may comprise an attention layer, which may also be trained as part of the reinforcement learning training.

The method further comprises providing 230 the machine-learning model, e.g. as a deep neural network. For example, the machine-learning model may be provided via a computer-readable storage, e.g. via the one or more storage devices.

The interface 22 may correspond to one or more inputs and/or outputs for receiving and/or transmitting information, which may be in digital (bit) values according to a specified code, within a module, between modules or between modules of different entities. For example, the interface 22 may comprise interface circuitry configured to receive and/or transmit information.

In examples the one or more processors 24 may be implemented using one or more processing units, one or more processing devices, any means for processing, such as a processor, a computer or a programmable hardware component being operable with accordingly adapted software. In other words, the described function of the ne or more processing modules 24 may as well be implemented in software, which is then executed on one or more programmable hardware components. Such hardware components may comprise a general-purpose processor, a Digital Signal Processor (DSP), a micro-controller, etc.

In at least some examples, the one or more storage devices 26 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system, method and computer program for training the machine-learning model are mentioned in connection with the proposed concept or one or more examples described above or below (e.g. FIG. 1a to 1b, 3 to 5). The system, method and computer program for training the machine-learning model may comprise one or more additional optional features corresponding to one or more aspects of the proposed concept or one or more examples described above or below.

Various examples of the present disclosure relate to an approach for efficient routing optimization by deep reinforcement learning.

In various cases, it may be beneficial to have a scalable route optimization approach to improve the route planning, charging, delivery, fleet management, etc. For example, the overall distance or related cost may be improved or optimized under a variety of constraints. Many use cases may benefit from a general framework that is able to handle a distance between driving destinations. Thus, a machine-learning model can be applied on distances learnt for route from map services, rather than on a straight-line distance between a pair of locations given in coordinates. In practice, there are many use cases profiting from a scalable optimization service to improve the user experience.

In some optimization algorithms, deep and/or reinforcement learning has been applied on TSP or alike, with the potential to provide a fast but sub-optimal solution. Previous algorithms have, however, all applied the nodes given by coordinates, rather than distance. However, for a given pair of location represented by coordinate, the distance between them varies depending on the road network, which leads to routes that most likely differ from a straight line between coordinates. Examples of the present disclosure may provide a scalable algorithm based on the route distance, rather than coordinates, to address real life use cases.

In the present disclosure, a novel and more efficient algorithm is provided that can greatly improve the complexity with acceptable sub-optimal performance using reinforcement learning, while directly considering pairwise distances between the locations. In short, the proposed algorithm has a decreased computational complexity, while aiming to address real-life problems, thus potentially providing the enabling technology toward optimization as a service (OaaS) concepts.

In various examples, the optimization problem is formulated as scalable optimization algorithm that is applied on a distance-based graph. A deep reinforcement learning algorithm framework may be employed. The performance may be improved using a well-designed embedding and loss function.

Various examples provide an approach that can be used in an Optimization as a Service (OaaS) scheme. For example, a constraint optimization algorithm may enable one or more the following services, though no limited to: Optimizing or improving user experience by multi-destinations-trip planning (minimizing or reducing the travel time, distance, cost, including time-critical tasks, e.g. appointment), optimizing or improving energy consumption by charging recommendation based on trip plan and context, enabling new business for optimizing fleet management for ride sharing, incubating new business models, e.g. e-commerce and O2O (Online-to-Offline) by OaaS recommendation, smart charging to promote clean energy by improving the range via trip and charging planning, optimizing or improving traffic by centralized trip planning for crowd drivers (reducing the traffic, air pollution, thus better environment protection).

In the following, several use cases are presented, in which the proposed system can be employed. A first use-case relates to task-oriented route planning. For example, a driver may consider a number of different driving stops (driving destinations), such as home (which may be a known destination and the start of the tour), bank (which may be any bank), refueling (e.g. at a preferred destination or vendor), supermarket (e.g. a frequently used supermarket), school (a known destination) and home (a known destination, and an end of the tour). The proposed system may be used to determine a visiting order of the destinations, while taking into account opening hours of the trips. If the destinations cannot be fit into a tour, one of the destinations may be eliminated. For example, of the destinations home, restaurant, museum, fitness and home, the destination "museum" may be eliminated.

A second use case relates to route planning for driving safety. In this use case, the routes may be annotated with a normalized weather score, e.g. "Route A is foggy in a certain time range", or "Route B may experience snow in a certain time range". Such information may be used for training the machine-learning model (and the reward function may reflect that information, e.g. with a penalty for bad weather), and used as an input at the machine-learning model. For example, when bad weather is expected for a route, a different route may be chosen (e.g. a route that uses a tunnel or that is not prone to fog).

A third use-case relates to pickup/delivery in fleet management. For example, various nodes may be considered—start nodes, pickup nodes (e.g. multiple pickup nodes)—delivery nodes/charging nodes—and end nodes (e.g. in this order). For example, such a use-case may be relevant for ride-hailing-like service providers with electric vehicles, and may consider parking, charging, pickup and/or delivery. For example, driving destinations may be removed if the vehicle is occupied.

A fourth use-case relates to ride sharing, pool and fleet management. For example, the propose concept may be used for learning matching problem, e.g. to address vehicle assignment optimization/improvement and/or vehicle reallocation for self-balancing (e.g. vehicle distribution according to user distribution). For example, multiple users and multiple vehicles, and maintenance, service and charging of the vehicles may be considered in this use case. For example, the new business model of mobility on demand may be enabled by the concept in such a use case.

A fifth use-case relates to smart charging. In this case, the following parameters may be comprised in a data set XYZi, j: Location (l), Distance (d), Duration or time (t), Price (p), Battery Level (B), opening (o), User ID (i), Location (charging at c) or location start from (s), Location end at (e), charging station ID (j). For example, two routes between a $l_{si}$ (location start i) and a lei (location end i) may be defined—directly or via charging station (location charging j). On the direct route, the distance from start to end ($dse_i$) and the duration from start to end ($tse_i$) may be considered. On the route via the charging station, the distance from start to the charging station ($dsc_{i,j}$) and the distance from the charging station to the destination ($dce_{i,j}$) may be considered.

Solving the optimization problem may be NP-hard. For the travel salesman problem (TSP), the native solution has the time complexity O(n!), e.g. 5!=120, 10!=3,628,800 and 20!=2.43×10$^{18}$. A dynamic programming algorithm may address the problem with time complexity: $O(n^2 \times 2^n)$, but it may have an exponential worst-case running time. On the other hand, most optimization objectives have a (time) constraint. The complexity may be dramatically increased, particularly with time-windows constraint. There may be a high demand to address a dynamic change of context, e.g. appointment or schedule, traffic, weather.

Various examples of the present disclosure may provide a scalable optimization algorithm, which may improve the user experience. Consequently, a constraint optimization (MIP) approach may be used as approach to address offline and time-insensitive use cases, and scalable optimization (DL) may be used as a sub-optimal but scalable algorithm.

The presented approach may be useful for companies and services that work towards mobility services, e.g. location-based services, routing, car sharing, fleet management, delivery and pickup, to mobility recommendation and productivity.

Figure 3:
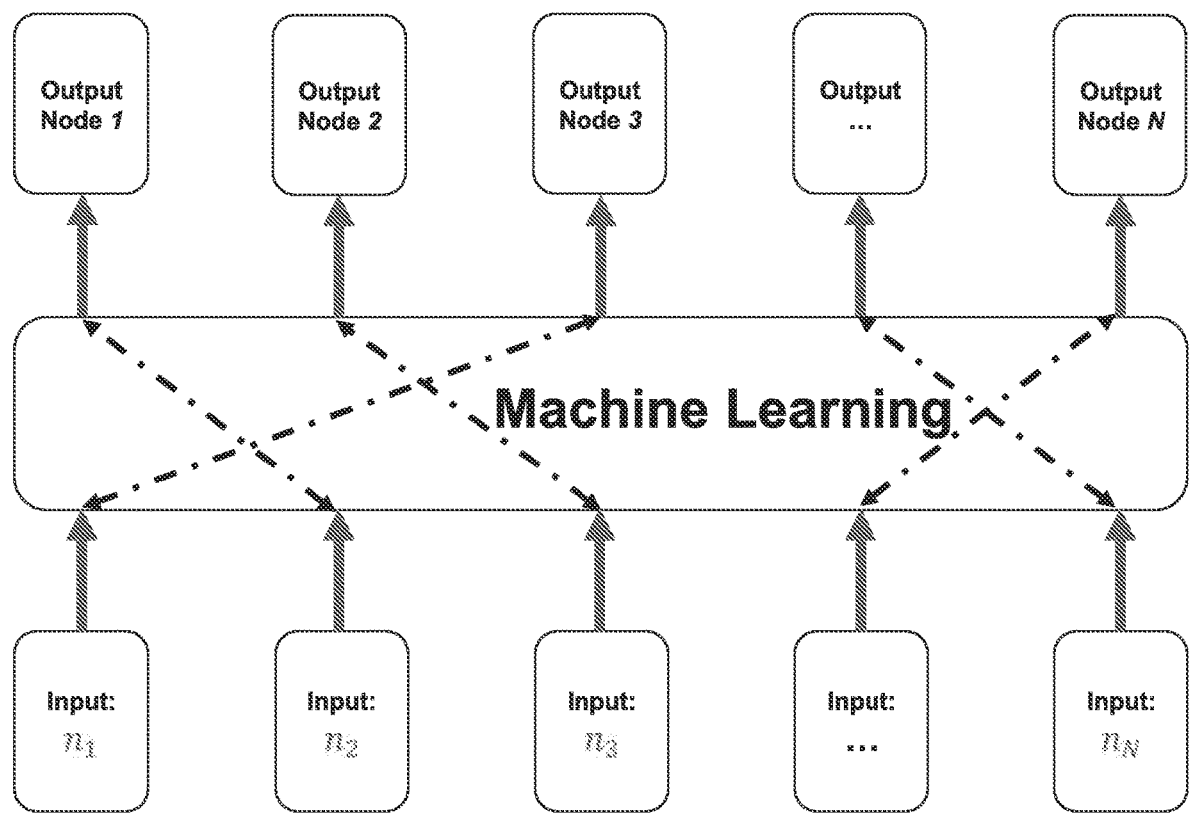
FIG. 3 shows an illustration of a flow of information in an example using a scalable optimization algorithm.

Various examples of the present disclosure provide a scalable optimization algorithm that is based on distance. FIG. 3 shows an illustration of a flow of information in an example using a scalable optimization algorithm. In the following, N nodes (e.g. driving destinations) $n_i$, where $1 \leq i \leq N$ are assumed. FIG. 3 shows input nodes $n_1$-$n_N$, which are used to input information into a machine-learning model, and output nodes 1 to N, which are used to provide an output of the machine-learning model. Within the machine-learning model, the information provided to the input nodes may influence the output provided via the output nodes, as shown by the dashed arrows. If coordinates were used as inputs, they may be defined as $n_i$=($lat_i$, $lon_i$). The distance D, however, may be defined as $$D = \begin{pmatrix} d_{11} & \cdots & d_{1N} \\ \vdots & \ddots & \vdots \\ d_{N1} & \cdots & d_{NN} \end{pmatrix}$$

where $d_{ij}$=dist($n_i$,$n_j$) from route service. For tidal lanes or one-way route, $d_{ij} \neq d_{ji}$. For case of M nodes, where M<N, $d_{i(M)}$=$d_{i(M+1)}$=...=$d_{i(N)}$ may be used. Each location may be represented by coordinate $n_1$=($lat_1$, $lon_1$) or distance $$\begin{pmatrix} d_{11} & \cdots & d_{1N} \\ \vdots & \ddots & \vdots \\ d_{N1} & \cdots & d_{NN} \end{pmatrix},$$

or simplified by ($d_{11}$ ... $d_{1N}$).

In some approaches, the input to input node $n_1$ may be ($lat_1$, $lon_1$), and that of $n_n$ may be ($lat_N$, $lon_N$). In various examples of the present disclosure, the input to input node $n_1$ may be ($d_{11}$, ..., $d_{1N}$), and that of input node $n_n$ may be ($d_{N1}$ ... $d_{NN}$). With a time window as constraint, the input to input node $n_1$ may be ($lat_1$, $lon_1$, $tw_1$), and that of $n_N$ may be ($lat_N$, $lon_N$, $tw_N$), or, in various examples of the present disclosure, the input to input node $n_1$ may be ($d_{11}$, ..., $d_1$N, $tw_1$), and that of input node $n_n$ may be ($d_{N1}$, ... $d_{NN}$, $tw_N$), with tw denoting the respective time window.

Figure 4:
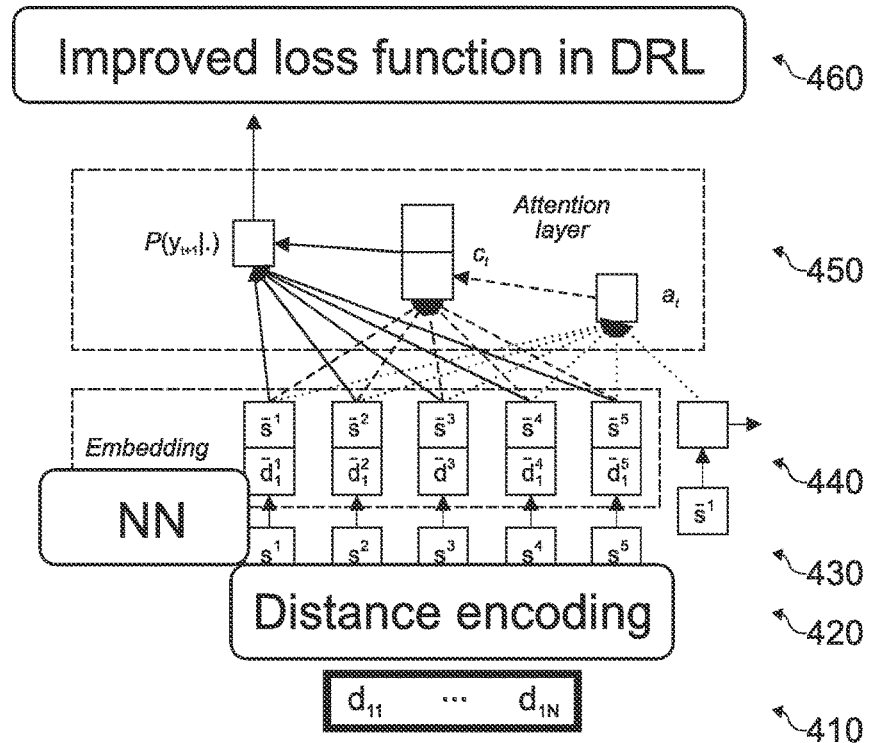
FIG. 4 shows an example of different layers of a machine-learning model.

As has been pointed out before, "Neural Combinatorial Optimization with Reinforcement Learning", published by Google in ICLR (2017) uses pointer networks to address the TSP problem. It takes coordinates as input to train the model. "Reinforcement leaning for solving the vehicle routing problem", published by Lehigh University in NIPS (2018) improves the presented pointer networks, is, however, also based on using coordinates as input. Furthermore, a linear embedding function is used in "Reinforcement leaning for solving the vehicle routing problem". FIG. 4 shows an example of different layers of a machine-learning model. As shown in FIG. 4, various examples of the present disclosure build upon the approach taken in Reinforcement leaning for solving the vehicle routing problem", where, contrary to the previously taken approach, the distance encoding 410, 420 $d_{11}$ ... $d_{1N}$ is used to provide an input 430 to the machine-learning model, a neural network (NN) may be used for embedding 440, and attention layer 450 is used after the embedding, and an improved loss function/reward function is used in the deep reinforcement learning 460.

Figure 5:
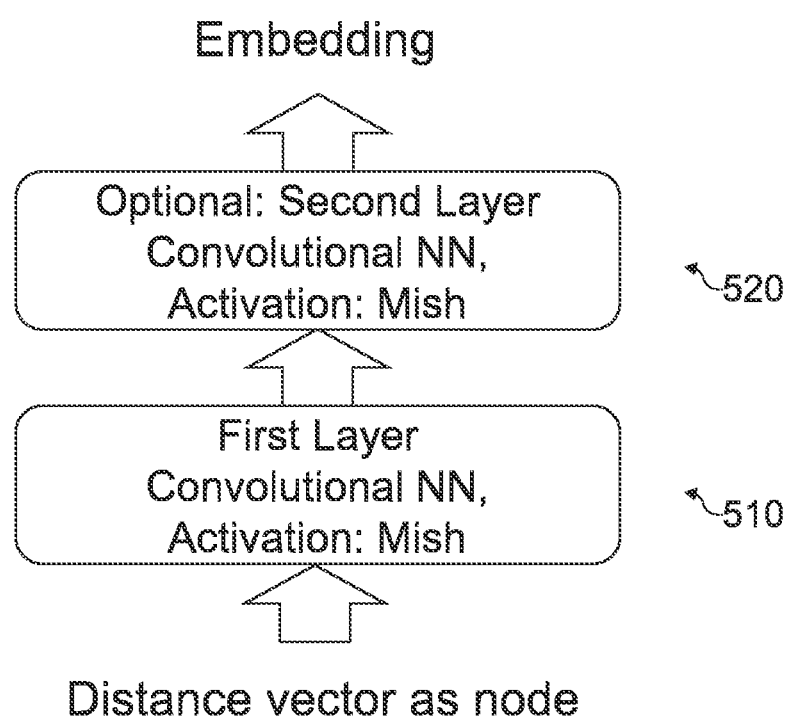
FIG. 5 shows a diagram of one or two layers being used for an embedding.

In a reference implementation, embedding by Neural Network (NN) is used. FIG. 5 shows a diagram of one or two layers being used for the embedding. For example, a first layer 510 comprising a convolutional neural network with a Mish activation function may be used. Optionally, in addition, a second layer 520, also with a convolutional network neural network with a Mish activation function may be used. Embedding may play a key role for learning an intrinsic property of a graph comprising nodes and the distance for each of edges. For a distance-based solution, the graph is getting complex to learn, thus modeling capable of embedding it may be used. In the proposed implementation, a non-linear embedding by neural networks is used, using an architecture having 1 or 2 layers, and an activation function, preferably Mish, then PReLU (parametric rectified linear unit), then LeakyReLU, and then ReLU. In tests, Mish has performed the best, followed by parametric ReLU.

Mish is a self-regularized non-monotonic activation function, with $f(x)$=$x \cdot tanh(ln(1+e^x))$. Mish has a smoother transition, resulting in smoother loss functions, which are easier to optimize and hence the network may generalize better. Compared with the most typical activation functions, such as ReLU, Leaky ReLU, PReLU and other variants, the most of them similar to ReLU may have sharp transitions and thus prove to be challenge to effective optimization of gradients.

Various examples use an improved loss function to optimize the training reliably, so it can better leverage the large-scale training data set and more epochs, though it might train slow. In various examples, the accumulated actor cross entropy loss is used.

In an experimental setup, a performance evaluation was performed between a distance-based and a coordinate-based algorithm (baseline). In the experiment, the Model is trained on d: [20]×[20]—>R, with 3 million samples used for training and 30000 samples used for validation, and 1000 for tests. The hyper-parameters used were Embedding: 128D, Mini Batch: 256 and Epoch: 50. The algorithms Solver (optimal but slow, OrTools from Google), coordinate-based cDRL, and distance-based dDRL (the proposed concept) were evaluated. Evaluation metrics were the gap=[distance(DRL)−distance(Solver)]/distance (Solver)

in %. The distance-based approach achieved a gap of 5.8%, and the coordinate-based approach achieved a gap of 3.5%. Thus, the distance-based approach is promising, though the performance can be further improved.

Various examples may provide a scalable algorithm for the presented NP-Hard problem toward the optimization as a service (OaaS): It may be fundamental for scalable service to respond in the meaningful time, with low computational complexity algorithm for optimization problems that are NP-Hard in nature. It broadens the use cases, thus bringing more value for consumers and businesses. Various examples may provide an applicable approach to bring true value for user experience and business value: algorithm applies on the distance-based space to meet the real life setup, e.g. route distance, rather than the ideal straight line distance, tidal lane rather than a symmetric route which keeps the distance same either from A to B or B to A. Various examples may provide an improved user experience, enabled by optimization as a service from route planning, saving the cost and time, reducing the traffic and air pollution, extending the range to smart recommendation, e.g. charging, etc. Furthermore, no label data may be required, as the proposed system might not require ground truth as manually collected training labels because of the reinforcement learning framework, making the training low cost and attractive. Various examples may provide an improved business value, by improving the cost for car-sharing services, delivery and pickup services. It may also enable new business models, e.g. recommendation or targeted ad when help user to optimize the objective, such as route planning. It may bring the opportunity to jointly optimize user experience (saving the cost, time, and effort) and the 3rd party services (profit from charging, refueling, parking, restaurant), with constantly learnt user preference. Various examples may provide no limitation for the reference machine learning framework: In this disclosure, merely a reference implementation is discussed, but it has no limitation to it. In general, the distance-based approach can be applied to other machine learning framework, e.g. transformer-based algorithms for possible performance improvement and other added-values.

Applications of the proposed concept range from location-based services, routing, car sharing, fleet management, delivery and pickup, to mobility recommendation and productivity. The proposed concept has the potential to be used in journey management and smart service such as charging.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A system for determining an order of a plurality of driving destinations, the system comprising one or more processors and one or more storage devices, wherein the system is configured to:
    obtain information on a distance between the plurality of driving destinations, the distance being defined for a plurality of routes between the plurality of driving destinations, with the routes being defined separately in both directions between each combination of driving destinations of the plurality of driving destinations within the information on the distance;
    provide the information on the distance between the plurality of driving destinations as input to a machine-learning model, the machine-learning model being trained to output information on an order of the plurality of routes based on the information on the distance provided at the input of the machine-learning model, wherein the machine-learning model is trained to output information on a favorability of the plurality of routes based on the information on the distance provided at the input of the machine-learning model, the favorability relating to how beneficial the inclusion of a specific route is for the order of the plurality of driving destinations; and
    determine the information on the order of the plurality of driving destinations based on the information on the order of the plurality of routes and the information on the favorability of the plurality of routes.

2. The system according to claim 1, wherein the machine-learning model is trained using reinforcement learning, with a reward function of the training being based on the distance between the plurality of driving destinations.

3. The system according to claim 1, wherein the machine-learning model comprises one or more embedding layers, the one or more embedding layers being based on a non-linear activation function.

4. The system according to claim 3, wherein the one or more embedding layers are based on a Mish activation function.

5. The system according to claim 1, wherein the machine-learning model comprises a pre-defined number of inputs for a pre-defined number of driving destinations.

6. The system according to claim 5, wherein, if the plurality of driving destinations comprises fewer than the pre-defined number of driving destinations, the information on the distance comprises one or more entries having a distance being lower than a threshold to at least one of the plurality of driving destinations.

7. The system according to claim 1, wherein the distance of the routes is defined along one or more roads.

8. The system according to claim 1, wherein the system is configured to obtain the information on the distance by determining the routes via one or more roads between the plurality of driving destinations based on a plurality of locations corresponding to the plurality of driving destinations.

9. The system according to claim 1, wherein the plurality of driving destinations comprise one or more stops of a ride-hailing service, a ride-sharing service or a delivery service.

10. The system according to claim 1, wherein the plurality of driving destinations comprise one or more charging stations.

11. A system for training a machine-learning model, the system comprising one or more processors and one or more storage devices, wherein the system is configured to:
    obtain training input data for training the machine-learning model, the training input data comprising training information on a distance between a plurality of driving destinations, the distance being defined for a plurality of routes between the plurality of driving destinations, with the routes being defined separately in both directions between each combination of driving destinations of the plurality of driving destinations within the information on the distance;
    train the machine-learning model using a reinforcement learning algorithm and a reward function,
        the machine-learning model being trained to output information on an order of the plurality of routes based on the training information on the distance provided at the input of the machine-learning model, wherein the machine-learning model is trained to output information on a favorability of the plurality of routes based on the information on the distance provided at the input of the machine-learning model, the favorability relating to how beneficial the inclusion of a specific route is for the order of the plurality of driving destinations, and
        the reward function being based on the distance between the plurality of driving destinations; and
    provide the machine-learning model.

12. The system according to claim 11, wherein the machine-learning model comprises one or more embedding layers, the one or more embedding layers being based on a non-linear activation function.

13. The system according to claim 12, wherein the one or more embedding layers are based on a Mish activation function.

14. The system according to claim 11, wherein the distance of the routes are defined along one or more roads.

15. A non-transitory, computer readable-readable storage medium including program code, when executed, to cause a machine to perform method for determining an order of a plurality of driving destinations, the method comprising:
    obtaining information on a distance between the plurality of driving destinations, the distance being defined for a plurality of routes between the plurality of driving destinations, with the routes being defined separately in both directions between each combination of driving destinations of the plurality of driving destinations within the information on the distance;
    providing the information on the distance between the plurality of driving destinations as input to a machine-learning model, the machine-learning model being trained to output information on an order of the plurality of routes based on the information on the distance provided at the input of the machine-learning model, wherein the machine-learning model is trained to output information on a favorability of the plurality of routes based on the information on the distance provided at the input of the machine-learning model, the favorability relating to how beneficial the inclusion of a specific route is for the order of the plurality of driving destinations; and
    determining the information on the order of the plurality of driving destinations based on the information on the order of the plurality of routes and the information on the favorability of the plurality of routes.

* * * * *